(12) United States Patent
Wright

(10) Patent No.: US 7,395,366 B1
(45) Date of Patent: Jul. 1, 2008

(54) SYSTEM, METHOD, AND APPARATUS FOR CONNECTING USB PERIPHERALS AT EXTENDED DISTANCES FROM A HOST COMPUTER

(75) Inventor: David Gordon Wright, Escondido, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 185 days.

(21) Appl. No.: 10/260,054

(22) Filed: Sep. 27, 2002

(51) Int. Cl.
G06F 13/36 (2006.01)

(52) U.S. Cl. ............................ 710/315; 710/60; 710/63; 710/313

(58) Field of Classification Search ......... 710/300–306, 710/310–315, 105–106, 60–64, 72, 8–12
See application file for complete search history.

(56) References Cited

U.S. PATENT DOCUMENTS

| | | | |
|---|---|---|---|
| 5,890,015 A * | 3/1999 | Garney et al. .................. 710/62 |
| 5,905,389 A | 5/1999 | Alleven |
| 5,912,569 A | 6/1999 | Alleven |
| 5,929,664 A | 7/1999 | Alleven |
| 6,040,792 A | 3/2000 | Watson et al. |
| 6,073,193 A | 6/2000 | Yap |
| 6,124,750 A | 9/2000 | Alleven et al. |
| 6,381,666 B1 * | 4/2002 | Kejser et al. ................. 710/300 |
| 6,389,494 B1 | 5/2002 | Walton et al. |
| 6,408,351 B1 * | 6/2002 | Hamdi et al. .................. 710/63 |
| 6,541,879 B1 | 4/2003 | Wright |
| 6,584,519 B1 * | 6/2003 | Russell .......................... 710/62 |
| 6,625,761 B1 | 9/2003 | Sartore et al. |
| 6,633,583 B1 * | 10/2003 | Esterson ....................... 370/466 |
| 6,671,831 B1 | 12/2003 | Sartore et al. |
| 6,691,201 B1 | 2/2004 | Williams et al. |
| 6,708,247 B1 * | 3/2004 | Barret et al. .................. 710/313 |
| 6,754,725 B1 | 6/2004 | Wright et al. |
| 6,813,672 B1 | 11/2004 | Kamran et al. |
| 6,820,160 B1 | 11/2004 | Allman |
| 6,839,778 B1 | 1/2005 | Sartore et al. |
| 6,862,643 B2 * | 3/2005 | Wu et al. ...................... 710/302 |
| 7,028,133 B1 * | 4/2006 | Jackson ....................... 710/313 |
| 2002/0010821 A1 * | 1/2002 | Yu et al. ...................... 710/100 |
| 2003/0041205 A1 * | 2/2003 | Wu et al. ...................... 710/302 |

FOREIGN PATENT DOCUMENTS

WO     WO 01/11476 A1 *  2/2001

\* cited by examiner

*Primary Examiner*—Raymond N Phan

(57) ABSTRACT

An apparatus, method, and system for coupling a host computer to a peripheral device over an extended distance. In one example, a first hub is provided for coupling with the host computer, the first hub configured as a compound device including a hub function and an embedded function, the first hub configured such that the embedded function is a virtual hub thereby providing an additional amount of time for signal transmissions by the first hub. A communications link is provided for coupling the first hub with the peripheral device, the characteristics of the communications link being based in part on the additional amount of time made available by the configuration of the first hub. In this manner, in one example, the length of the communications link may be extended beyond a standard USB cable length to consume the additional amount of time provided by the hub configuration, and transmissions may be made between the host computer and the peripheral device over the communications link in a manner that is within the USB timing specifications.

20 Claims, 5 Drawing Sheets

SYSTEM, METHOD, AND APPARATUS FOR CONNECTING USB PERIPHERALS AT EXTENDED DISTANCES FROM A HOST COMPUTER

TECHNICAL FIELD

This application relates, in general, to communications between USB host devices and peripheral devices.

BACKGROUND

The universal serial bus (USB) provides a low cost solution for attaching peripheral devices to a host, such as a host computer or host server. Devices that are attached to a USB bus are automatically detected and software automatically configures the devices for immediate use, typically without user intervention. The USB devices/peripherals may include devices such as printers, scanners, keyboards, a mouse, digital cameras, digital video cameras, data acquisition devices, modems, speakers, telephones or video phones, storage devices such as ZIP drives, or other peripherals.

A USB specification entitled "Universal Serial Bus Revision 2.0 Specification" available at www.usb.org, the disclosure of which is hereby incorporated by reference in its entirety, dictates that a USB bus can support 127 devices. Typically, a USB bus may include a host connected by a USB cable to a peripheral/device. By convention, data transmitted in the direction of the peripheral device is said to be in the "downstream" direction, while data transmitted in the direction of the host is said to be in the "upstream" direction.

A USB bus can be extended with a hub which can support and drive additional devices. The total number of devices (hubs and peripherals) that can be supported by a single USB host is 127. A number of hubs may be interconnected in a tiered star topology, where each hub acts as the center of a star to which peripherals are attached for a particular tier level. Due to timing constraints, the maximum number of tiers allowed in a USB bus is seven (including the root tier which has the host).

A hub is a repeater and has a hub controller, an upstream port, and a plurality of downstream ports to which one or more peripherals can be attached. A hub broadcasts data to downstream ports and can also transmit data from a downstream port upstream towards the host. The hub controller, which may include a microcontroller or other programmable logic, controls the hub under operations of software. The hub controller communicates with the host computer, and monitors peripherals or other devices attached to the hub. For instance, a hub controller may report to the host computer connection status regarding the peripheral devices coupled with downstream ports of the hub.

Many USB devices have their own built in cable, socket, or connectors. Per the USB specification, "A" and "B" connectors are utilized, where "A" connectors are for making connections "upstream" towards the computer, while "B" connectors are for making connections "downstream" and connect to individual devices or other hubs. The USB specification effectively places a limit of 5 meters (about 16.5 feet) on the length of a USB cable by regulating the propagation delay from a peripheral to the host computer.

As recognized by the present inventor, it would be beneficial to provide a connection between USB peripherals and a host computer of a distance greater than 5 meters. For instance, various industrial or laboratory applications of computer systems often require that the keyboard, mouse, or disk drive of a host computer be remote. Furthermore, there may be other instances a user wishes to connect a USB device to a USB host at a distance greater that 5 meters.

While a system of five interconnected hubs could be provided in order to increase the distance between the peripheral and the host to 25 meters (approximately 82.5 feet), such a system would be disadvantageous because at least two of the five hubs would be required to have their own power source, which may not always be available in the particular environment where the 25 meters of cable and hubs are to be used (for example, in a conduits or trunking embedded in walls, ceilings, or floors). One example of such a system is illustrated in FIG. 1, wherein a host 10 is coupled with a USB device/peripheral 12 through two 5 meter cables 14 and a hub 16. Further, many applications require that a USB system be provided such that an additional hub can be connected to the USB bus, which would require that four hubs be connected at 5 meters each, totaling 20 meters or 66 feet.

Accordingly, as recognized by the present inventor, what is needed is a system, method, and apparatus for connecting USB devices/peripherals at extended distances from a host computer, while preferably not violating any propagation times set forth by the USB standards.

It is against this background that various embodiments of the present invention were developed.

SUMMARY

According to one broad aspect of one embodiment of the present invention, disclosed herein is a method for coupling a host computer to a peripheral device over an extended distance. In one example, the method includes providing a first hub for coupling with the host computer, the first hub configured as a compound device including a hub function and an embedded function, the embedded function being a virtual hub thereby providing an additional amount of time for signal transmissions from the hub. The additional amount of time may be derived in part from the time budget made available by the inclusion of the virtual hub. The method may also include providing for a communications link for coupling the first hub with the peripheral device, the characteristics (e.g., length) of the communications link being based in part on the additional amount of time. In this manner, in one example, the length of the communications link may be extended beyond a standard USB cable length to consume the additional amount of time provided by the hub configuration, and the communications link will preferably not introduce any signal transmission propagation delay outside of the USB time budget for the hub configuration.

In one example, a second hub may be provided for coupling the peripheral device with the first hub using the communications link, the second hub configured as a compound device including a hub function and an embedded function, the embedded function being a second virtual hub thereby providing a second additional amount of time for signal transmissions. In this example, the characteristics of the communications link are based in part on the first and second additional amounts of time. For instance, where the communications link is a cable, the cable may have a length of, for example 100 feet.

In one embodiment, the operation of providing for a communications link includes providing for converting a USB signal into a second signal and providing for transmitting the second signal over the communications link, such as a cable, a wireless medium, or an optical fiber. The communications link may be chosen so as to improve noise immunity for signal transmissions over extended distances.

According to another broad aspect of one embodiment of the present invention, disclosed herein is an apparatus for converting a universal serial bus (USB) signal to be transmitted over an extended connection. In one embodiment, the apparatus includes a hub and a signal converter. The hub has an upstream port and a plurality of downstream ports and is configured as a USB compound device including a hub function and an embedded function, the embedded function configured as another hub. The signal converter converts a USB signal into a second signal medium, such as low voltage differential signals (LVDS) form. The signal converter may have an input coupled with one of the plurality of downstream ports of the hub for receiving a USB signal, and an output for transmitting the signal in the form of the second medium.

In one example, the second signal medium may include a cable having 2 pairs of differential wires at a length in the range of, for example, approximately 16 feet to 110 feet. Alternatively, the second signal medium may be a wireless signal medium where the signal converter converts the USB signal into a wireless signal.

According to another broad aspect of one embodiment of the present invention, disclosed herein is a system for coupling a host computer to a peripheral device. In one example, the system includes a local device and a remote device. The local device has an input adapted for coupling with the host computer and an output for coupling with the remote device which may be coupled with the peripheral. The local device includes a hub controller for receiving USB signals from the host computer, the hub controller configured as a universal serial bus (USB) compound device including a hub function and an embedded function, the embedded function being another hub (i.e., a virtual hub); and the local device may include a signal converter for converting a USB signal received from the host computer by the hub controller into a second signal medium. The signal converter may have an output for transmitting the USB signal in the second medium to the remote device. The remote device includes an input adapted for receiving the output of the local device, and an output adapted for coupling with the peripheral device. The remote device may include a signal converter for converting a signal from the second medium into a USB signal; and a hub controller providing the USB signal to the peripheral device.

In one example, the hub controller of the remote device is configured as a universal serial bus (USB) compound device including a hub function and an embedded function, the embedded function being a virtual hub. The local and remote devices may be coupled over a cable, a fiber optic cable, a wireless transmission link, or other communications link.

According to another broad aspect of one embodiment of the present invention, disclosed herein is a method for coupling a host computer to a peripheral device. In one embodiment, the method includes providing a first hub for coupling with the host computer, the first hub configured as a compound device including a hub function and an embedded function, the embedded function being another hub. The method may also include providing a second hub for coupling with the peripheral device, the second hub configured as a compound device including a hub function and an embedded function, the embedded function being another hub. In one example, the method also includes providing for receiving a universal serial bus (USB) signal at the first hub; providing for converting the USB signal into a second signal; providing for transmitting the second signal over a communications link; providing for receiving the second signal; providing for converting the second signal into a USB signal; and providing for receiving the USB signal by the peripheral at the second hub.

The foregoing and other features, utilities and advantages of the invention will be apparent from the following more particular description of various embodiments of the invention as illustrated in the accompanying drawings and claims.

DETAILED DESCRIPTION

Disclosed herein is an apparatus, system, and method for connecting a USB host device, such as a host computer or server, with a USB peripheral over extended distances, such as approximately 100 feet or more. In accordance with one embodiment of the invention, a hub is provided for coupling with the host, the hub configured as a compound device including a hub function and an embedded function, the embedded function being a second hub (i.e., virtual hub). By configuring the hub in this manner, an additional amount of time for signal transmissions from the hub is made available. A communications link for coupling the first hub with the peripheral device over an extended distance may be provided wherein the characteristics (e.g., length) of the communications link is based in part on the additional amount of time. In this manner, in one example, the length of the communications link may be extended beyond a standard USB cable length to consume the additional amount of time provided by the hub configuration, and the communications link will preferably not introduce any signal transmission propagation delays outside of the USB time budget for the hub configuration. Various embodiments of the invention will now be described.

Figure 1:
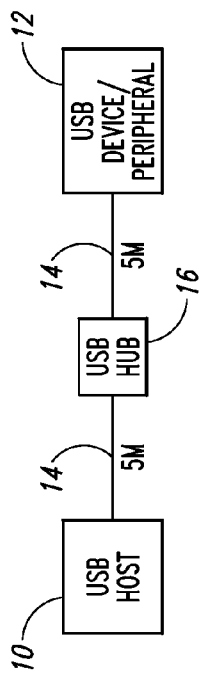
FIG. 1 illustrates a block diagram of a USB host coupled with a USB peripheral through a hub.
Figure 2:
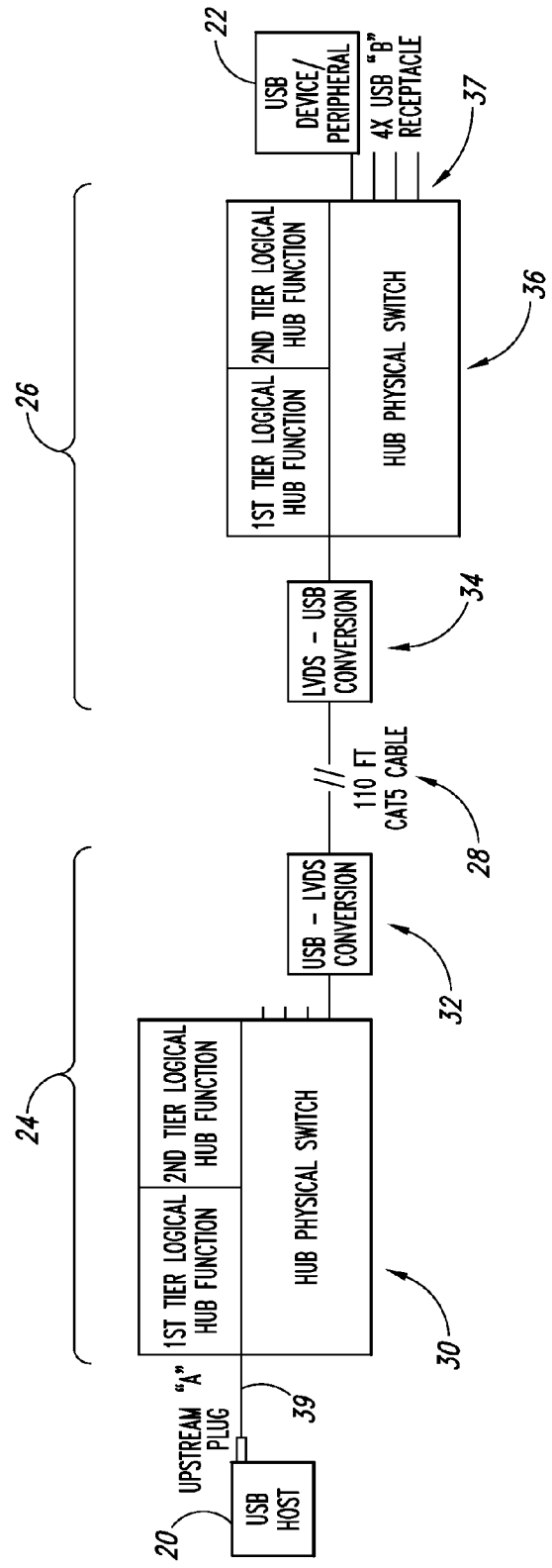
FIG. 2 illustrates a block diagram of a USB host coupled with a USB peripheral through a set of hubs and signal converters over a communications link, in accordance with one embodiment of the present invention.

FIG. 2 shows one embodiment of the invention wherein a USB host 20 (also shown as a root port) is coupled with a peripheral device 22 through a local unit 24, a remote unit 26, and a communications link 28 provided in order to extend the connection between the host 20 and the device/peripheral 22. A USB host 20 may include, but is not limited to, a computer, server, or any other device capable of being the master of a USB bus, while a peripheral device 22 may include, but is not limited to, devices such as printers, scanners, keyboards, a mouse, digital cameras, digital video cameras, data acquisition devices, modems, speakers, telephones or video phones, storage devices such as ZIP drives, or other peripherals.

The local unit 24 has a hub 30 and a signal converter 32, and the remote unit 26 has a signal converter 34 and a hub 36. The hub 30 and the signal converter 32 (or the signal converter 34 and hub 36) may be embodied as a single device or apparatus or may be integrated into a single integrated circuit. In one example, the signal converter 32 performs a conversion of a USB signal into a low voltage, differential signal (LVDS) format and signal converter 34 performs a reverse transformation from LVDS to USB. In this format, the communications link 28 may include a cable such as a CAT5 cable of 110 feet connected between the local unit 24 and the remote unit 26.

The communications link 28 may include one or more conductors, wires, optical fibers, transmission medium such as wireless transmission (including infrared or RF wireless), or other means of communicating a signal from the signal converter 32 of the local unit 24 to the signal converter 34 to the remote unit 26. The LVDS transmission medium 28 shown in FIG. 2 is one example of the cabling or transmission medium 28 which can be provided. One benefit of LVDS is that the cable may be terminated at both ends, thereby reducing the amount of electromagnetic reflections which may occur during signal transmissions from the host 20 to the peripheral 22 over the transmission medium 28. Further, LVDS drivers have very low delays from the input to the output of the drivers, and therefore do not add or introduce substantially any signal transmission or propagation delays. LVDS is also an inexpensive transmission medium.

On the opposing end of the communications link 28, in one embodiment the remote unit 26 is provided having a signal converter 34 and a hub 36, to which the peripheral device 22 is coupled. The signal converter 34 is provided for receiving the signals transmitted via the communications link 28 to the remote unit 26 which is coupled with the peripheral 22. In this manner, the signal received by the signal converter 34 is converted and delivered to the peripheral 22. In one embodiment, the signal converter 34 and hub 36 may be embodied in a single apparatus, device, or integrated circuit, if desired.

In one embodiment, the hub 36 of the remote unit 26 is configured to permit connections with one or more peripheral devices 22 thereto, as well as to permit the connection of additional hubs to the hub 36. In this manner, this embodiment of the invention permits additional hubs to be utilized in the system at the end of the remote unit 26 if desired in a particular application.

The host 20 may be coupled with the local unit 24 over a cable 39 of, for example 3 meters, while the peripheral 22 may be coupled with the remote unit 26 using a standard USB A-B cable which may be 5 meters in length, for example. In one embodiment, the remote unit 26 is configured having four USB downstream ports 37, each having a USB "B" receptacle.

In accordance with on embodiment of the present invention, in order that transmissions from the host 20 to the peripheral device 22 are within the timing requirements dictated by the USB specification, the local and remote units 24, 26 are configured such that they realize a time budget savings of propagation delay times. By virtue of the savings of the propagation delay times, a communications link 28 may be provided that permits a connection between host 20 and peripheral device 22 to be extended beyond standard USB cable lengths. For instance, a cable 28 of a length substantially greater than five meters can be connected between the local unit 24 and the remote unit 26.

In one embodiment, the local hub 30 is configured as a USB compound device that combines the functionality of a hub together with an embedded downstream function configured to be a hub (i.e., a virtual hub), so that the local hub 30 is in effect configured as a USB hub with an embedded or virtual USB hub as the embedded function (i.e., the first tier logical USB function is a hub, and the second tier logical function is also a hub). In this manner, the local hub 30 has two USB Device addresses which it will respond to, and hub 30 can act as two devices—the local hub 30 can act as a hub itself using the first device address, and the hub 30 can act as a virtual hub downstream using a second device address.

Per the USB specification, on a per hub basis, 70 nanoseconds of propagation delay are permitted for compliance with the specification for signal transmissions between an "A" plug on the upstream connection of a hub (e.g., for a host) to a "B" receptacle on the hub's downstream port(s) (i.e., for a peripheral). Therefore, because the hub 30 is configured as a hub with an embedded function which is a virtual USB hub, the time budget for such a hub configuration would be 140 nanoseconds (70 nanoseconds plus 70 nanoseconds). However, because the local unit 24 may be physically implemented using a single hub microcontroller chip (FIG. 4) which may be characterized by, for example, a 20 nanosecond propagation delay; and because an approximately three foot long cable 39 (FIGS. 2-3) may be used between the host 20 and the hub 30 having approximately a five nanosecond propagation delay associated therewith; the time budget utilized by the local unit 24 and its associated cable 39 to the host 20 is approximately 25 nanoseconds, in one example.

Since, as recognized by the present inventor, the USB specification would provide 140 nanoseconds for this configuration of hub 30, there are approximately 115 nanoseconds of additional unused time available (140 nanoseconds minus 25 nanoseconds equals 115 nanoseconds) in this example. Accordingly, 115 nanoseconds of additional time corresponds approximately to 60 feet of cabling (using an approximation of six inches per nanosecond of propagation delay over a transmission medium 28 of a cable, in one example)-which means that the use of the local unit 24 having a hub 30 configured as a compound device with an embedded hub function permits the use of a communications link 28 which would consume this additional amount of time for propagating the signal along the communications link, such as a cable of approximately 60 feet in one example. The amount of delay introduced by the signal converter 32 should also be taken into account in the design of the communications link.

If a remote unit 26 and hub 36 are provided with similar characteristics as the local unit 24 and hub 30 (i.e., hub 36 configured as a compound device with an embedded hub function, except that the remote unit 26 may not need a 3 meter cable), then another 115 nanoseconds of additional time is made available which therefore permits the use an additional approximately 60 feet of cabling in one example. Accordingly, because of the additional times made available by the hub configurations of local unit 24 and remote unit 26, a cable 28 of approximately 120 feet can be utilized between the local and remote units 24, 26 while maintaining the time budget expected by USB host 20 and peripheral 22.

Figure 3:
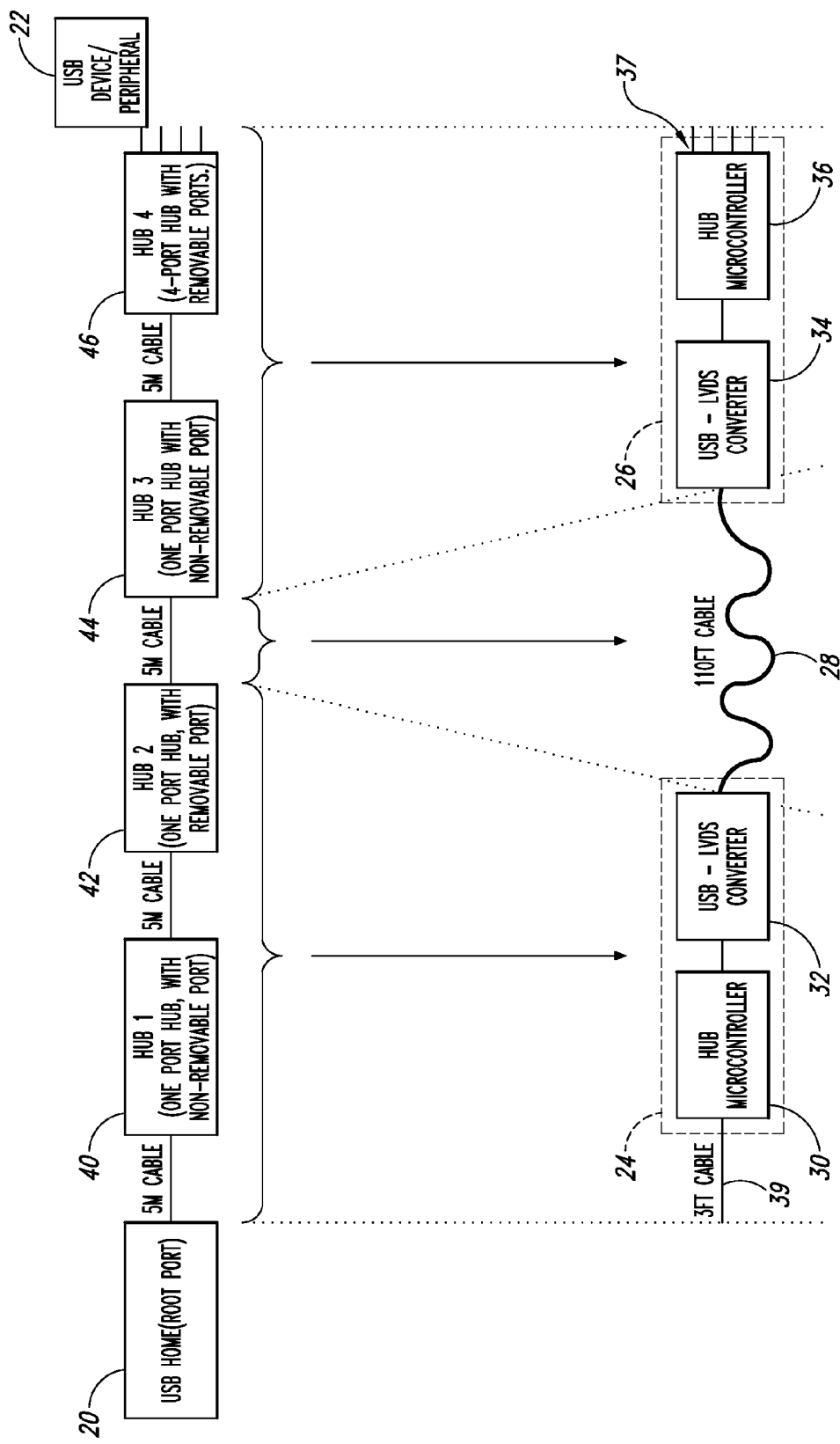
FIG. 3 illustrates a logical representation of the hubs of FIG. 2 as seen by the host, in accordance with one embodiment of the present invention.

FIG. 3 illustrates a representation of the hubs 30, 36 as seen by the host 20 corresponding to the block diagram of FIG. 2, in accordance with one embodiment of the present invention. As shown in FIG. 3, because the local unit 24 is configured as a hub with an embedded function of a hub, the host 20 sees a first hub 40 (i.e., a one port hub with a non-removable port) coupled with a second hub 42 (i.e., a one port hub, with a removable port). Because the local unit 24 is coupled with the remote unit 26 through the signal converters 32, 34 and transmission medium 28 shown in FIG. 2, the host computer 20 sees the second hub 42 coupled with a downstream third hub 44 coupled with a downstream fourth hub 46 coupled with the peripheral 22. Since the remote unit 26 is configured as a USB hub with an embedded function of a USB hub, the host computer 20 sees the remote unit 26 as the third hub 44 (i.e., one port hub with a non-removable port) coupled with the fourth hub 46 (i.e., a four port hub with removable ports). The peripheral device 22 is coupled with a port of the remote unit 26 (which appears to the host 20 as being coupled with the fourth hub 46).

In this example, since the host 20 sees the peripheral 22 coupled through four hubs 40, 42, 44, 46, the time budget permitted under the USB specification for transmitting a signal from the host 20 to the peripheral 22 is greater than the amount of time actually consumed by the local hub 30 and the remote hub 36, and the time remaining in the transmission budget can be actually consumed by extended cabling or signaling of communication link or medium 28.

Figure 4:
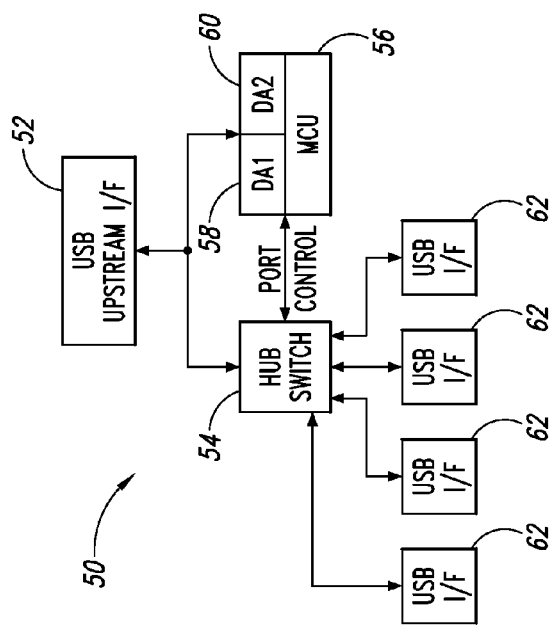
FIG. 4 illustrates a block diagram of an example of a hub which may be used in conjunction with embodiments of the present invention.

FIG. 4 illustrates a block diagram of an example of a USB hub 50 which may be used at either the local or remote hubs 30, 36 shown in FIG. 2. In one example, the hub 50 may be formed using or include an integrated circuit such as a peripheral controller with integrated hub, or a USB hub with microcontroller.

As shown in FIG. 4, the hub 50 may include an upstream interface 52, a hub switch 54, a microcontroller 56 responsive to data addresses 58, 60, and a plurality of a USB downstream ports 62. For example, in the case of the local USB hub 30 receiving data from the host 20, the upstream interface 52 receives the data and makes the data available for processing by the microcontroller 56 of the local hub, which in turn broadcasts data to the active USB downstream ports 62. The hub 50 may support two USB device addresses 58, 60 with one device address 58 for the hub and the other device address 60 for an embedded downstream device configured as a virtual hub. The hub 50 may also include a serial interface engine (not shown) which allows the host 20 to communicate to the hub 50 and functions integrated into the microcontroller 56 of the hub 50. It is understood that while four downstream ports 62 are shown in FIG. 4, the hub 50 may contain a different number of downstream ports depending on the particular application.

Figure 5:
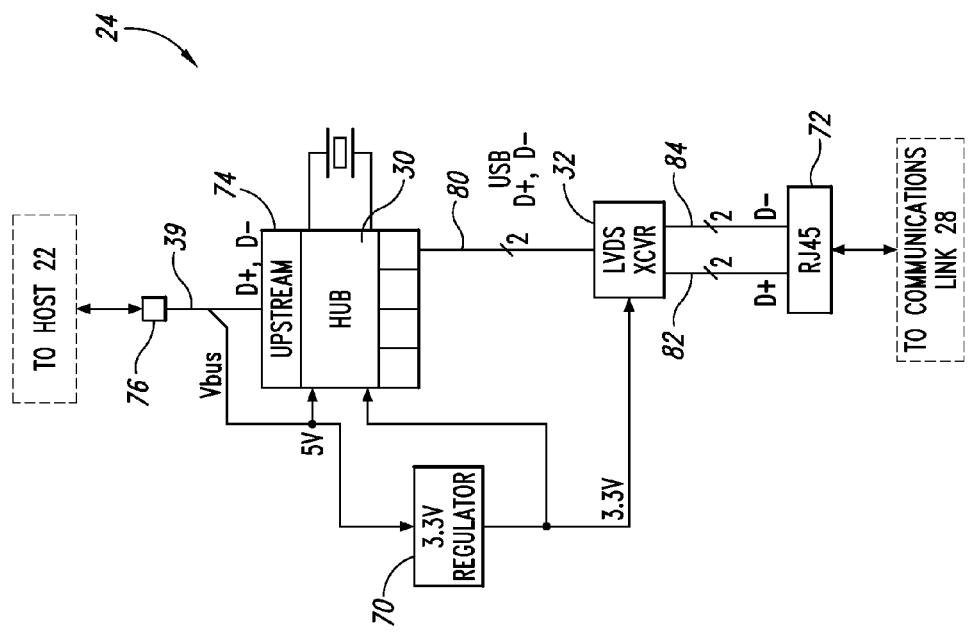
FIG. 5 illustrates an example of a local unit including a hub and a signal converter, in accordance with an embodiment of the present invention.

Referring to FIG. 5, a block diagram of an example of a local unit 24 is illustrated, in accordance with one embodiment of the present invention. The local unit 24 includes a hub 30 and a signal converter 32, and may also include a voltage regulator 70 and a connector 72. The upstream port 74 of the hub 30 may be coupled with an "A" connector 76 and cable 39 for connecting the upstream port 74 to the host 22.

A voltage regulator 70 (i.e., providing 3.3 volts) may be provided which derives a regulated voltage signal from the bus voltage (Vbus) of the cable, in one example. The regulated voltage signal may be coupled with the hub 30 as well as with the signal converter 32, which in this example is an LVDS transceiver. In one example, the LVDS transceiver 32 converts the USB signal lines 80, including the data lines D+ and D−, into differential signal pairs 82, 84 shown in FIG. 5 as Differential D+ as a two wire signal 82, and a Differential D− as a two wire signal 84. These LVDS signals 82, 84 may be made available using an RJ45 connector 72 for connection with the communications link 28.

In operation, when a USB signal from the host 22 is received by hub 30 through the connector 76, the hub 30 processes the USB signal and passes the appropriate data to the appropriate downstream port of the hub 30 to the signal converter 32. At the signal converter 32, the USB signal is converted into a second signal medium, such as LVDS, and transmitted to the communications link 28 over connector 72.

Figure 6:
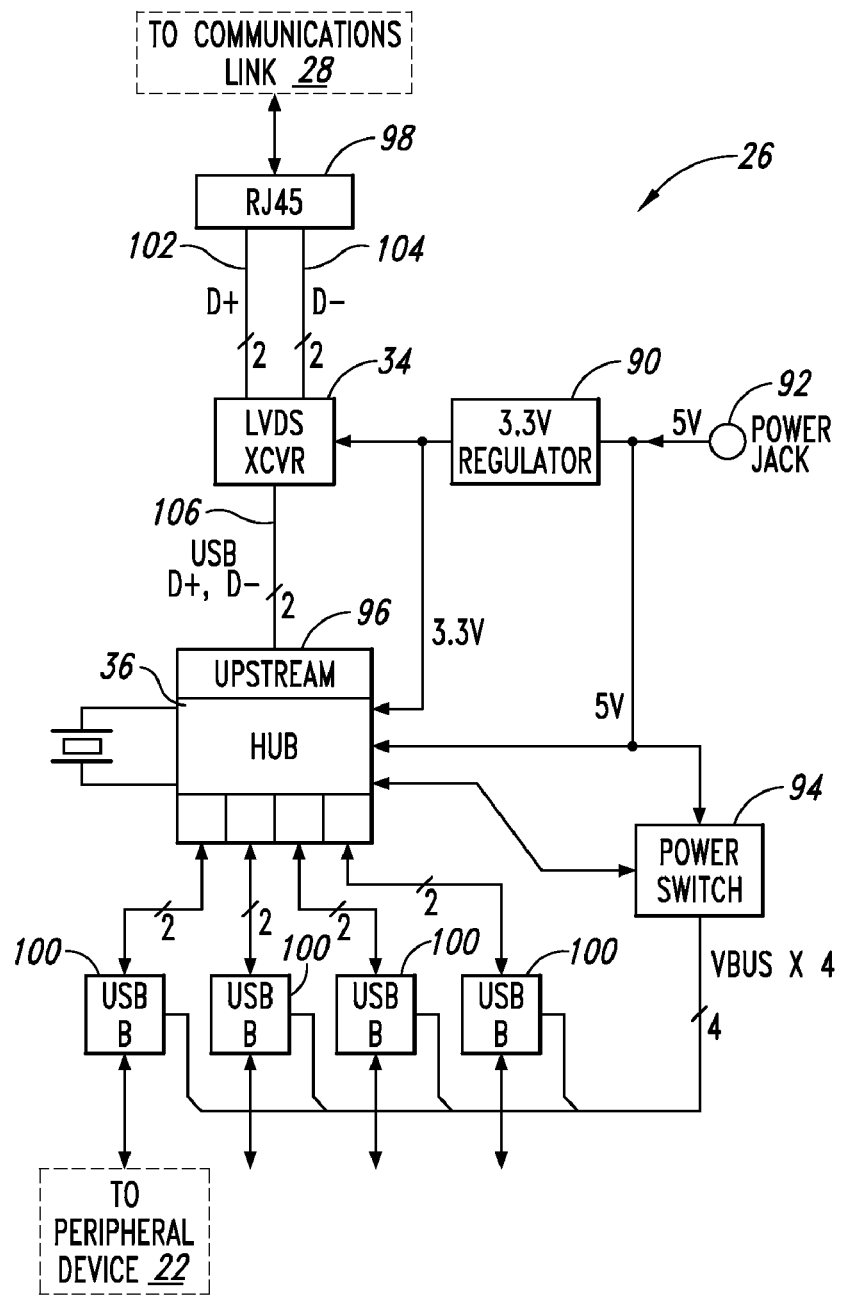
FIG. 6 illustrates an example of a remote unit including a signal converter and a hub, in accordance with an embodiment of the present invention.

Referring to FIG. 6, one example of a remote unit 26 is illustrated, in accordance with one embodiment of the present invention. In this embodiment, the remote unit 26 includes a signal converter 34 and a hub 36, and may also include a voltage regulator 90, a jack 92 for receiving externally supplied power, and a power switch 94. The upstream port 96 of the hub 36 is coupled with the signal converter 34 (in this example, a LVDS transceiver) which is coupled with the communications link 28 through a connector 98, for example, an RJ45 connector.

In one example, the remote unit 26 is provided with a power jack 92 for receiving a power signal provided externally (i.e., 5 volts). The received power signal may be regulated down, for example to 3.3 volts, for providing power to the LVDS transceiver 34 as well as other portions of the hub 36. The power signal may also be coupled through a power switch 94 to one or more of the USB downstream ports 100 of the hub 36, so that the hub 36 may supply and control power to each of the downstream ports 100, for example, 500 milliamps at 5 volts, in order to place the downstream ports 100 in compliance with USB power management requirements.

In operation, when a signal 102, 104 is received through the connector 98 by the LVDS transceiver 34, the signal is converted into a USB signal format and provided as a USB signal 106 to the upstream port 96 of the hub 36. The hub 36 processes the USB signal 106 and passes the appropriate data to the appropriate downstream ports 100 of the hub 36. Each of the downstream ports 100 may be coupled with a device or peripheral 22 using a standard USB "B" cable.

While the various embodiments of FIGS. 2-6 have been described with reference to transmitting a signal from host 20 to peripheral 22, it is understood that a signal could also be transmitted from the peripheral 22 to the host 20.

Figure 7:
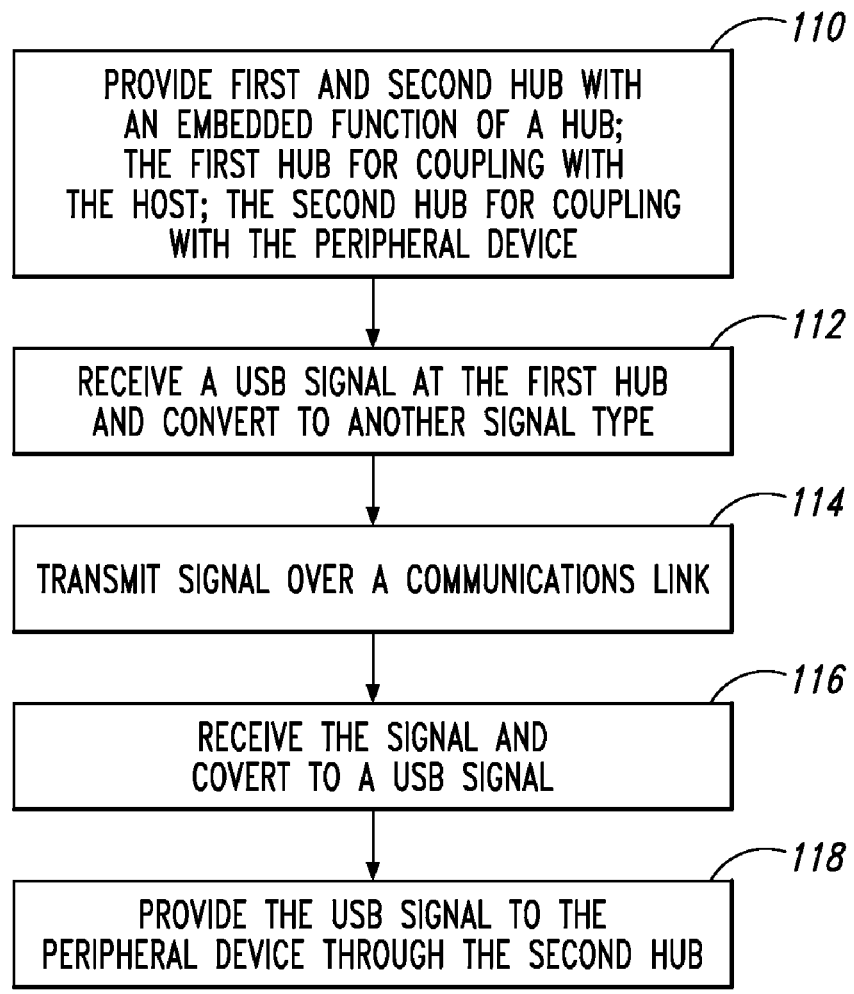
FIG. 7 illustrates an example of logical operations for transmitting a USB signal from a host computer to a peripheral device over an extended distance, in accordance with an embodiment of the present invention.

FIG. 7 illustrates an example of logical operations for transmitting a USB signal from a host computer to a peripheral device over an extended distance, in accordance with one embodiment of the present invention. At operation 110, a first and second hub are provided with an embedded function of a hub. The first hub is adapted for coupling with the host, for example through a USB cable, and the second hub is adopted for a coupling with a peripheral device, for example using a USB cable.

At operation 112, a USB signal from the host computer is received at the first hub, and the USB signal is converted to another signal type suitable for transmission over a communications link. In one embodiment, operation 112 converts a USB signal to a low voltage differential signals (LVDS) type, which provides a level of noise immunity and is suitable for signal transmissions over extended distances. The LVDS signals may be transmitted over a conductor such as a CAT 5 cable. In another embodiment, operation 112 converts a USB signal to a wireless signal, such as a infrared (IR) signal or a radio frequency (RF) wireless signal for transmission over a wireless communications link, or into a signal suitable for transmission over a fiber optic connection or other communications link. The type of communications link/signal type to which the USB signal is converted may depend, in part, on the environment in which the host computer and peripheral device are operating, as well as the types and amounts of noise sources present in such environments.

Having converted the USB signal into a signal type suitable for transmission over a communications link, operation 114 transmits the signal over the communications link. At operation 116, the signal is received and converted to a USB signal. In one embodiment, operation 116 performs a reverse conversion or transformation that is performed by operation 112. For instance, if operation 112 converted the USB signal to an LVDS signal, then operation 116 converts the LVDS signal into a USB signal. If operation 112 converted the USB signal into a wireless signal, then operation 116 would convert the wireless signal into a USB signal.

At operation 118, the USB signal is provided to the peripheral through the second hub, thereby completing the communications of the USB signal from the host computer to the peripheral device. Because operation 110 configured the hubs as having embedded functions of hubs (i.e., virtual hubs), the communications link used at operation 114 can be designed or selected to utilize the additional time made available by such hub configurations.

Accordingly, it can be seen that the operations of FIG. 7 provide for the transmission of a USB signal from a host computer to a peripheral device over an extended distance, while maintaining such transmission within the time specifications permitted by the USB specification. It is understood that while the operations shown in FIG. 7 relate to transmitting a signal from the host computer to the peripheral device, these operations may be used to transmit data from the peripheral device to the host computer—for example, transmitting a signal from the peripheral device through the second hub over the communications link through the first hub to the host computer.

By configuring the local unit 24 as a compound device having a hub function plus an embedded function being a hub function, such a configuration makes available additional time which can be utilized by an extended cable or communications link 28. Similarly, by configuring the remote unit 26 to be a compound device of a hub function together with an embedded function being a hub function, the remote unit similarly makes available additional time which can be utilized by an extended cable or communication link 28. Accordingly, embodiments of the present invention provide for extending a connection 28 between the host 20 and the peripheral 22 while maintaining the timing parameters of signal transmission as specified by the USB specification.

Furthermore, the hub 36 of the remote unit 26 is configured to permit a connection of peripherals or additional hubs to the remote unit 26. In this manner, this embodiment of the invention permits additional hubs to be utilized in the system at the end of the remote unit 26 if desired in a particular application. Alternatively, either the remote unit 26 or the local unit 24 can be configured to have three device addresses, which would increase the time budget available by, for example 70 nanoseconds, which could therefore provide a cable length of approximately 150 feet. In this example, because there would be the consumption of five hubs, such a configuration would not have the capability of attaching a further tier hubs downstream of the remote unit 26.

Various embodiments of the present invention have been described with reference to hubs 30 and 36 in order to provide a communications link of approximately 100 feet in one example. It is understood that a single hub, such as hub 30, may be configured as a USB compound device with an embedded function as a hub thereby providing an additional amount of time for signal transmissions by the hub. A communications link may be provided for coupling the peripheral device to the hub, wherein the characteristics of the communications link are based in part on the additional amount of time made available by the configuration of the hub. In FIG. 7, operation 110 can configure a first hub with an embedded function, and a peripheral may be directly coupled with the first hub over an extended distance, such as 60 feet in one example. In this example, signal conversation operations such as 112 and 116 of FIG. 7 may or may not be used depending upon the particular implementation.

In another embodiment, a single USB hub integrated circuit may be formed having an LVDS or other suitable physical layer connection and up to five device addresses thereby emulating the behavior of a chain of five USB hubs in a single device. In this example, the local unit may comprise a USB-LVDS converter, which may make available 330 nanoseconds to permit a cable of, for example, approximately 180 feet.

While the communications link 28 has been shown as a conductive cable, in another embodiment the transmission medium 28 may include transmission over a main electricity supply connection (such as a 110 volt or 220-240 volt connection), or telephone connections within buildings. Alternatively, the transmission medium 28 may be implemented using an optical fiber or a wireless (radio frequency (RF) or infrared (IR)) medium. By using a wireless transmission medium, the invention may be utilized to implement connections between USB hosts and USB peripherals over various distances, so long as the propagation delays associated with the transmission medium fall within the time periods made available by virtue of the local and remote unit configurations of embodiments of the present invention, as described above.

Embodiments of the present invention can be utilized where remote control of a PC or other USB host 20 is made through connection of a mouse and/or keyboard 22. Such environments may include industrial control environments wherein the keyboard and mouse 22 and a monitor (separately cabled) can be remotely coupled with a host PC 20 wherein the PC gathers data from data sources proximate to the PC, but the user or administrator wishes to control the operation of the PC from a remote location. Another environment may include professional audio and video processing, wherein a user may wish to remotely control a host PC 20 which gathers audio and/or video data locally. Further, an environment where there are multiple servers—such as a server "farm"—may also benefit from embodiments of the present invention. Using a keyboard/video/mouse (KVM) switch, a user can control, from a distance, multiple host servers. In another example, USB "web cams" (video cameras having transmitters transmitting USB data) can be positioned remotely from the host PC 20 to provide home surveillance and security. In another example, USB peripherals 22 at a point of sale in a retail environment can be coupled using embodiments of the present invention to a host computer controlling or monitoring the USB peripherals, wherein the peripherals 22 may include items such as USB compliant cash registers, USB bar code scanners, USB receipt printers, etc.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to a preferred embodiment thereof, it will be understood by those skilled in the art that various other changes in the form and details may be made without departing from the spirit and scope of the invention.

I claim:

1. An apparatus for converting a universal serial bus (USB) signal, comprising:
   a hub having an upstream port and a plurality of downstream ports, the hub configured as a USB compound device thereby providing an additional amount of time for signal transmissions, the compound device including a hub function having a first USB device address and an embedded function, the embedded function configured as another hub having a second USB device address different from the first USB device address; and a signal converter for converting a USB signal into a second signal medium, the signal converter having an input coupled with one of said plurality of downstream ports for receiving a USB signal, the signal converter having an output for transmitting the USB signal in the second medium.

2. The apparatus of claim 1, wherein the second signal medium is a cable, and the signal converter converts the USB signal into a low voltage differential signal.

3. The apparatus of claim 2, wherein the cable has a length in the range of approximately 16 feet to 110 feet.

4. The apparatus of claim 1, wherein the second signal medium is a wireless signal medium, and the signal converter converts the USB signal into a wireless signal.

5. A system for coupling a host computer to a peripheral device, the system comprising:

a first device having an input adapted for coupling with the host computer, the first device having an output; and a second device having an input adapted for receiving the output of the first device, the second device having an output adapted for coupling with the peripheral device;

wherein the first device includes a hub controller configured as a universal serial bus (USB) compound device, the configuration thereby making additional time available for signal transmissions, the compound device including a hub function having a first USB device address and an embedded function, the embedded function being another hub having a second USB device address different from the first USB device address; and a signal converter for converting a USB signal received from the hub controller into a second signal medium, the signal converter having an output for transmitting the USB signal in the second medium as the output of the first device.

6. The system of claim 5, wherein the second device includes:

a signal converter for converting a signal in the second medium into a USB signal, the signal converter having an output for transmitting the USB signal; and a hub controller receiving the USB signal transmitted by the signal converter of the second device, the hub controller having at least one port for coupling with the peripheral device, thereby providing the USB signal to the peripheral device.

7. The system of claim 5, wherein the hub controller of the second device is configured as a universal serial bus (USB) compound device including a hub function and an embedded function, the hub controller configured such that the embedded function is another hub.

8. The system of claim 5, further comprising:

means for coupling the first device to the second device.

9. The system of claim 7, wherein the means for coupling includes a wireless medium.

10. The system of claim 7, wherein the means for coupling includes a fiber optic cable.

11. A method for coupling a host computer to a peripheral device, the method comprising:

providing a first hub for coupling with the host computer, the first hub configured as a compound device the configuration thereby making additional time available for signal transmissions, the compound device including a hub function having a first USB device address and an embedded function, the first hub configured such that the embedded function is another hub having a second USB device address different from the first USB device address;

providing a second hub for coupling with the peripheral device, the second hub configured as a compound device the configuration thereby making additional time available for signal transmissions, the compound device including a hub function having a first USB device address and an embedded function, the second hub configured such that the embedded function is another hub having a second USB device address different from the first USB device address;

providing for receiving a universal serial bus (USB) signal at the first hub;

providing for converting the USB signal into a second signal;

providing for transmitting the second signal;

providing for receiving the second signal;

providing for converting the second signal into a USB signal; and providing for receiving the USB signal by the peripheral at the second hub.

12. The method of claim 11, wherein the transmitting operation includes transmitting the second signal over a cable.

13. The method of claim 11, wherein the transmitting operation includes transmitting the second signal over a wireless medium.

14. The method of claim 11, wherein the transmitting operation includes transmitting the second signal over a fiber optic medium.

15. A method for coupling a host computer to a peripheral device over an extended distance, the method comprising:

providing a first hub for coupling with the host computer, the first hub configured as a compound device including a hub function having a first USB device address and an embedded function, the first hub configured such that the embedded function is a virtual hub having a second USB device address different from the first USB device address thereby providing a first additional amount of time for signal transmissions; and providing for a communications link for coupling the first hub with the peripheral device, the characteristics of the communications link being based in part on the first additional amount of time.

16. The method of claim 15, further comprising:

providing a second hub for coupling the peripheral device with the first hub using the communications link, the second hub configured as a compound device including a hub function and an embedded function, the second hub configured such that the embedded function is a second virtual hub thereby providing a second additional amount of time for signal transmissions;

wherein the characteristics of the communications link are based in part on the first and second additional amount of time.

17. The method of claim 15, wherein the operation of providing for a communications link includes:

providing for converting a USB signal into a second signal; and providing for transmitting the second signal over the communications link.

18. The method of claim 17, wherein the operation of providing for transmitting includes:

providing for a cable as the communications link.

19. The method of claim 17, wherein the operation of providing for transmitting includes:
   providing for a wireless medium as the communications link.

20. The method of claim 17, wherein the operation of providing for transmitting includes:
   providing for a fiber optic link as the communications link.

* * * * *